United States Patent [19]
Allan

[11] 3,939,741
[45] Feb. 24, 1976

[54] METHOD AND APPARATUS FOR CUTTING REINFORCED FOAM

[75] Inventor: Winford K. Allan, Huntington Beach, Calif.

[73] Assignee: McDonnell Douglas Corporation, Long Beach, Calif.

[22] Filed: Dec. 23, 1974

[21] Appl. No.: 535,186

[52] U.S. Cl. .................................. 83/52; 83/835
[51] Int. Cl.² ........................................ B26D 3/00
[58] Field of Search ......... 83/52, 56, 835, 851, 848, 83/849

[56] References Cited
UNITED STATES PATENTS
1,334,941   3/1920   Blake ................................ 83/848

FOREIGN PATENTS OR APPLICATIONS
446,081   9/1912   France ................................ 83/848

Primary Examiner—Willie G. Abercrombie
Attorney, Agent, or Firm—John P. Scholl; Walter J. Jason; Donald L. Royer

[57] ABSTRACT

A saw blade having one tooth tilting to the left, one tooth tilting to the right, and a third tooth straight, repeated throughout the saw blade. Tilt causes the set teeth to be shorter than the straight teeth which first contact and cut the foam and fiber glass strands. The cut strands are free to move away from the following raker teeth which remove additional foam, leaving the desired tufts.

2 Claims, 6 Drawing Figures

METHOD AND APPARATUS FOR CUTTING REINFORCED FOAM

BACKGROUND OF THE PRESENT INVENTION

Reinforced foam is used as insulation. Typically, several layers of reinforcing strands are spaced throughout the thickness of a layer of foam material such as polyethylene, for example. These layers extend throughout the length and width of the material. One or more layers are used, depending upon the thickness and strength desired. Other fibers are inserted through the thickness of the material and the fiber ends, if exposed and not embedded in the foam, may be bonded to the structure to be insulated by the foam. In another embodiment, randomly oriented fibers are dispersed throughout the foam material to give it body and strength. The fibers preferably are fiber glass although any fibrous material may be used, if desired.

After the foaming action has been completed and the material has time-cured, it must be cut into sections for handling, storing and subsequent use. This cutting is done with saws which cut through the foam and fiber alike, leaving a smooth cut surface. This presents a problem when adjacent slabs of insulation are to be bonded together because the fibers of one slab may not make contact with the fibers on the adjacent slab. Also, the fiber ends do not make as good a contact to the structural surface to which it is to be bonded as would a short length of fiber. Hence, it is desirable for the fiber ends to protrude somewhat from the foam surface so that the short exposed fiber ends may bend and flatten out against the surface to which the slab is to be bonded, whether it be an adjacent slab or the structural surface to be insulated.

SUMMARY OF THE PRESENT INVENTION

In accordance with the present invention, slabs of reinforced foam insulation may be cut with the reinforcement fibers protruding from the cut surface of the foam. This may be done with a saw having teeth that cut through the foam and fiber glass strands plus a secondary removal of foam only, leaving strands or tufts protruding a specified distance from the cut foam surface.

In accomplishing the foregoing, the saw blade has teeth in a series of three. This series is repeated throughout the length of the blade. The first or leading tooth is straight and cuts both foam and fiber. The next tooth tilts to the left and the third tooth tilts to the right. These teeth, because of their tilt, are shorter than the straight ones which first cut the foam and fiber glass strands. The cut strands are free to move away from the following "raker" teeth which remove additional foam, leaving the desired tufts. The length of the tufts is a function of the amount of set in the raker teeth. However, longer exposed tufts can be obtained by making a second cut close to the face of the first cut at a relatively slow speed. The tufts bend rather than be cut while the additional foam is being cut away.

DETAILED DESCRIPTION OF ILLUSTRATIVE EMBODIMENT

Figure 1:
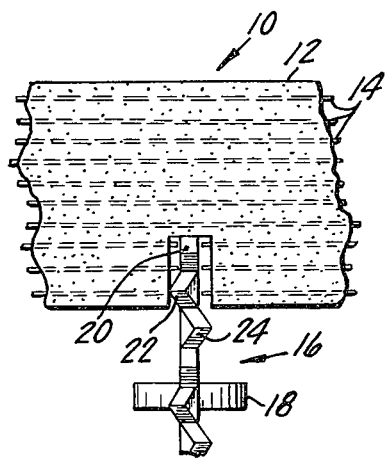
FIG. 1 is a plan view showing the blade of a circular saw commencing its cut through reinforced insulation.

Referring now to FIG. 1 there is shown a slab 10 of fiber glass reinforced foam insulation 12 in which the fiber glass strands 14 extend across a circular saw blade 16 which rotates about its axis 18. The teeth on saw blade 16 consists of sets of three types of teeth with the sets of teeth repeated throughout the cutting surface of the blade. Any number of teeth may be in each type in a set, although for clarity only one tooth is shown. A lead tooth 20, which is straight and in line with the plane of the blade, and left and right tilted follower teeth 22, 24, whose tips extend laterally from the plane of the blade to provide for a wider cut, make up a set of teeth. These follower teeth 22, 24 are known as raker teeth which, in the cutting of wood, for example, frees the cut area of chips and provides for a wider cut than the width of the saw blade so that the blade will not bind in the cut of the wood. However, in the cutting of reinforced foam insulation these raker teeth perform entirely different functions. The tilting of teeth 22 and 24 causes them to be shorter than straight tooth 20 which first contacts and cuts the foam 12 and fiber glass 14. The cut strands are free to bend from the raker teeth which remove additional foam, thereby producing desired tufts extending beyond the foam. While this embodiment utilizes a circular saw, a band saw or reciprocating saw may be used as effectively.

Figure 2:
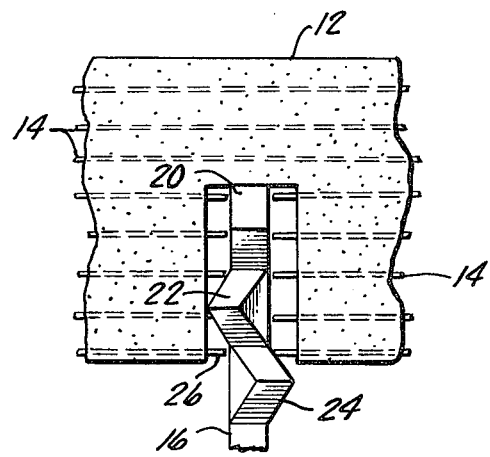
FIG. 2 is an enlarged partial plan view showing more clearly the blade cutting into the reinforced foam.

It can be seen in the enlarged partial view in FIG. 2 that blade 16 first cuts strands 14, thereby severing them at a point in alignment with the plane of blade 16. Shortly thereafter the tilted teeth 22 and 24 on each side pass through the material, removing additional foam along the sides to expose ends which had previously been cut.

Figure 3:
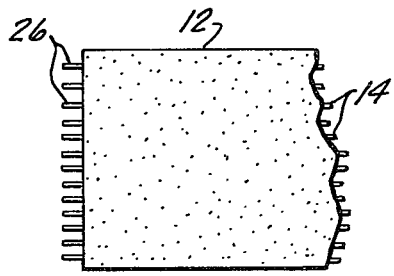
FIG. 3 is a plan view of an insulation material having been cut to provide for the extended exposed tufts.

In FIG. 3 there is shown the tufted ends 26 extending from the strands 14 embedded in the insulation foam 12. With these ends exposed, the material is ready for subsequent bonding to other material or to a structure to be insulated.

Figure 4:
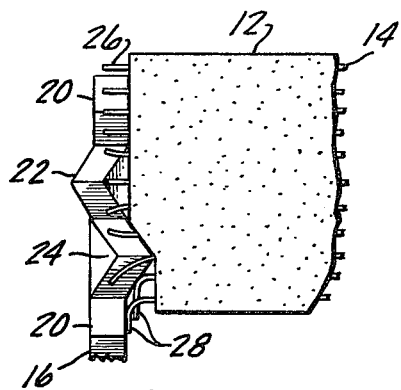
FIG. 4 is a plan view showing the foam material being cut a second time to provide for longer tufts.

In FIG. 4 there is shown a technique for obtaining longer ends when desired. The first cut exposing ends 26 is made at relatively high speed, on the order of 4300 rpm. It is preferable that the second cut adjacent the first should be at a lower speed, on the order of 700 rpm, to give the tufts 26 time to bend and flex with the teeth rather than have the teeth cut them. In this embodiment the ends 26 are on the order of one-eighth inch in length, whereas the tuft ends 28, lengthened by the second cut, may be on the order of three-eighths inch in length, if desired.

Figure 5:
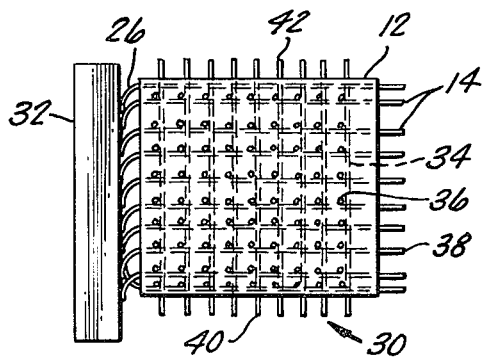
FIG. 5 shows the tufted end of an insulation material bonded to a structure.

In FIG. 5 there is shown a plank 30 having reinforced fibers 14 embedded in foam 12 and having exposed fiber ends 26 bonded to a structural member 32. Any appropriate bonding material may be used for this purpose. It can readily be seen that the fiber ends 26 crumpled against the surface of structural member 32 have a greater contacting and bonding surface than if the fiber ends merely abutted the surface. Plank 30 is shown as having other fibers 34 extending vertically and other fibers 36 extending horizontally and normal to the fibers 14. This plank has been cut on all six sides in the manner just described so that each of the surfaces have exposed tufted ends 38, 40, 42, for subsequent bonding to other planks or a layer of foil, not shown.

Figure 6:
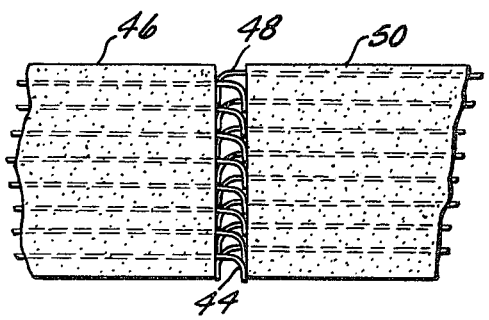
FIG. 6 shows two tufted end reinforced insulation pieces bonded together.

FIG. 6 illustrates how the fiber ends 44 extending from insulation plank 46 crumple against and become entwined with fiber ends 48 from insulation plank 50. Depending upon the density of the fibers in the planks and the length of their exposed ends, a very substantial number, if not all, of the fibers of one plank become bonded to the exposed fibers from the abutting plank, insuring bonding strength equal or greater than the planks themselves.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A method of cutting reinforced foam insulation comprising the steps of:
   a. passing a cutting tool through the insulation first cutting across strands extending through said insulation; and
   b. thereafter cutting the foam along a plane spaced from the cut ends of said strands and removing said foam adjacent thereto to thus expose the cut ends of said strands, said method being repeated until the cutting of the strands and foam has been completed whereby the plane of the tips of said ends is spaced from the plane of the cut surface of said insulation.

2. A method of cutting reinforced foam insulation as in claim 1 wherein the cutting tool is passed through the insulation a second time close to the plane of the first cut surface to remove more insulation and thereby increase the length of the exposed strands.

* * * * *

UNITED STATES PATENT OFFICE
CERTIFICATE OF CORRECTION

PATENT NO. : 3,939,741
DATED : 24 February 1976
INVENTOR(S) : Winford K. Allan

It is certified that error appears in the above-identified patent and that said Letters Patent are hereby corrected as shown below:

On the Title Page, [54], delete [AND APPARATUS] from the title of the invention; and In Column 1, Line 1, delete [AND APPARATUS] from the title of the invention.

*Signed and Sealed this*

*eleventh* Day of *May 1976*

[SEAL]

Attest:

RUTH C. MASON
Attesting Officer

C. MARSHALL DANN
Commissioner of Patents and Trademarks